(12) United States Patent
Nanukuttan et al.

(10) Patent No.: US 7,997,875 B2
(45) Date of Patent: Aug. 16, 2011

(54) WINGLET FOR WIND TURBINE ROTOR BLADE

(75) Inventors: Biju Nanukuttan, Jabalpur (IN); Jing Wang, Simpsonville, SC (US); EswaraRao V S J Anjuri, Anakapalle (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/947,074

(22) Filed: Nov. 16, 2010

(65) Prior Publication Data

US 2011/0142677 A1 Jun. 16, 2011

(51) Int. Cl.
  *B64C 27/467* (2006.01)
(52) U.S. Cl. .................... 416/237; 416/238
(58) Field of Classification Search .......... 416/238, 416/242, 237; 244/199.4
  See application file for complete search history.

(56) References Cited

U.S. PATENT DOCUMENTS

| | | | | |
|---|---|---|---|---|
| 5,035,577 A * | 7/1991 | Damongeot | ............ | 416/223 R |
| 5,348,253 A | 9/1994 | Gratzer | | |
| 6,722,615 B2 * | 4/2004 | Heller et al. | ............ | 244/199.4 |
| 2008/0093860 A1 | 4/2008 | Suzuki | | |
| 2009/0068019 A1 | 3/2009 | Wobben | | |
| 2009/0074583 A1 * | 3/2009 | Wobben | ............ | 416/223 R |
| 2009/0257885 A1 * | 10/2009 | Godsk et al. | ............ | 416/244 R |
| 2010/0155541 A1 * | 6/2010 | Garang | ............ | 244/199.4 |

FOREIGN PATENT DOCUMENTS

| JP | 2004084590 | 3/2004 |
|---|---|---|
| WO | WO 2006/059472 | 6/2006 |

OTHER PUBLICATIONS

Nangia, et al. "Aerodynamic Design Studies of Conventional & Unconventional Wings with Winglets", pp. 1-18, AIAA 2006-3460, San Francisco, 2006.
Johansen et al. "Aerodynamic Investigation of Winglets on Wind Turbine Blades using CFD", pp. 1-17, Riso National Laboratory, Denmark, Feb. 2006.
George, Fred. "Understanding Winglet Technology", pp. 1-7.

\* cited by examiner

*Primary Examiner* — Richard Edgar
(74) *Attorney, Agent, or Firm* — Dority & Manning, P.A.

(57) ABSTRACT

A rotor blade for a wind turbine is disclosed. The rotor blade includes a root, a tip, and a body extending from the root, the body including a pressure side and a suction side extending between a leading edge and a trailing edge. The rotor blade further includes a winglet extending between the body and the tip, the winglet including a pressure side and a suction side extending between a leading edge and a trailing edge. The winglet further includes a transition section and defines a height, a sweep angle, an outboard cant angle, and a twist angle. The sweep angle, the outboard cant angle, and the twist angle change continuously throughout the transition section.

19 Claims, 3 Drawing Sheets

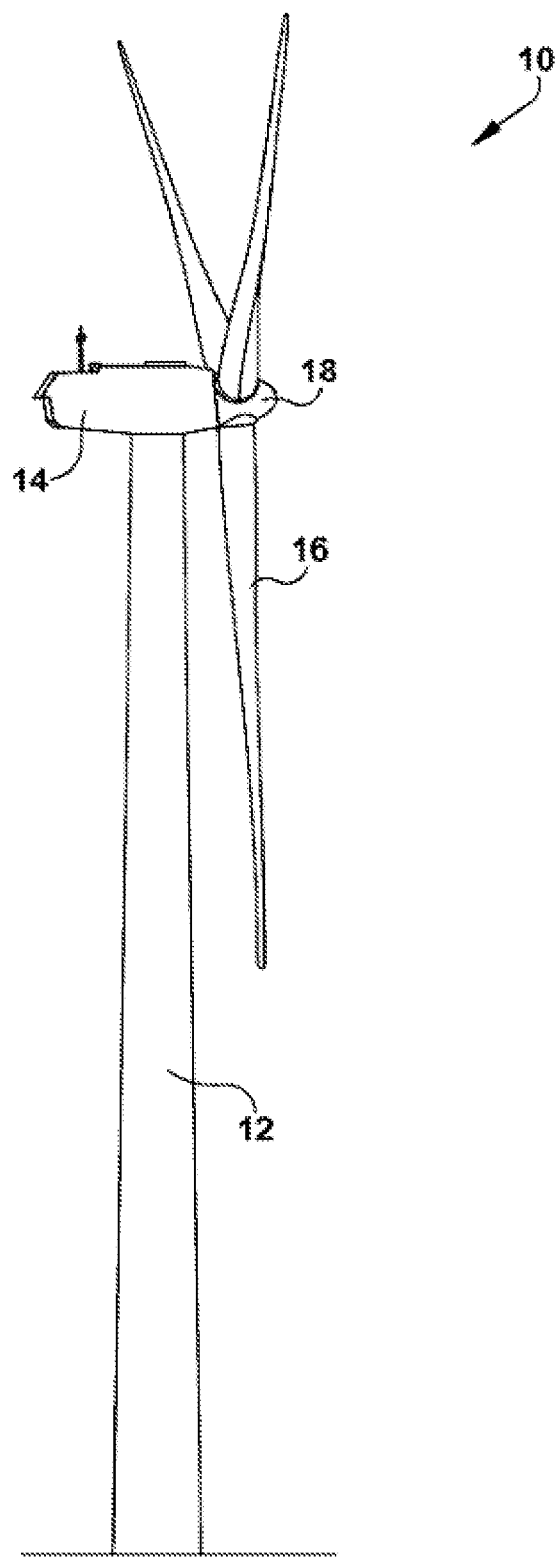
FIG. -1-

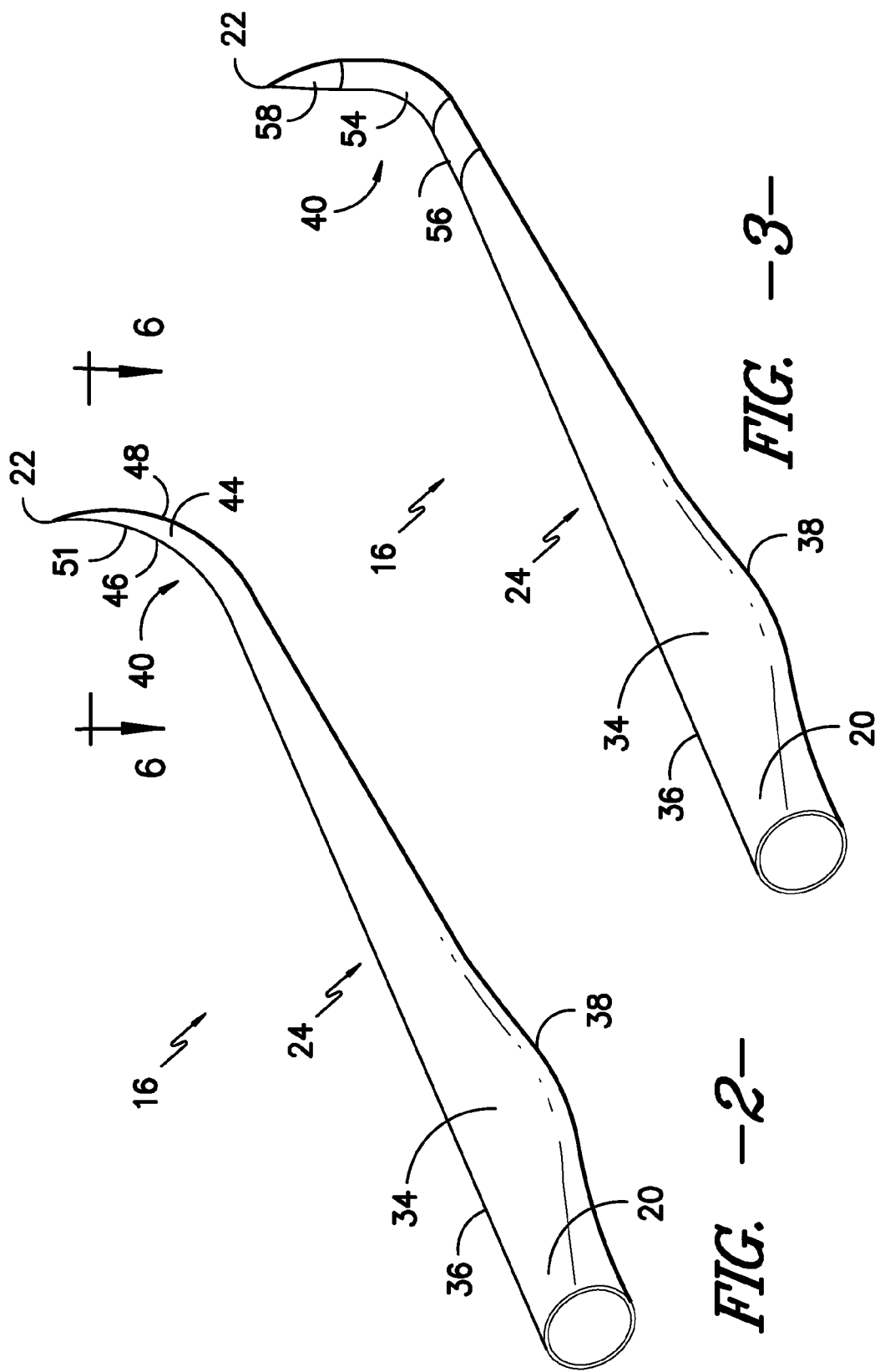

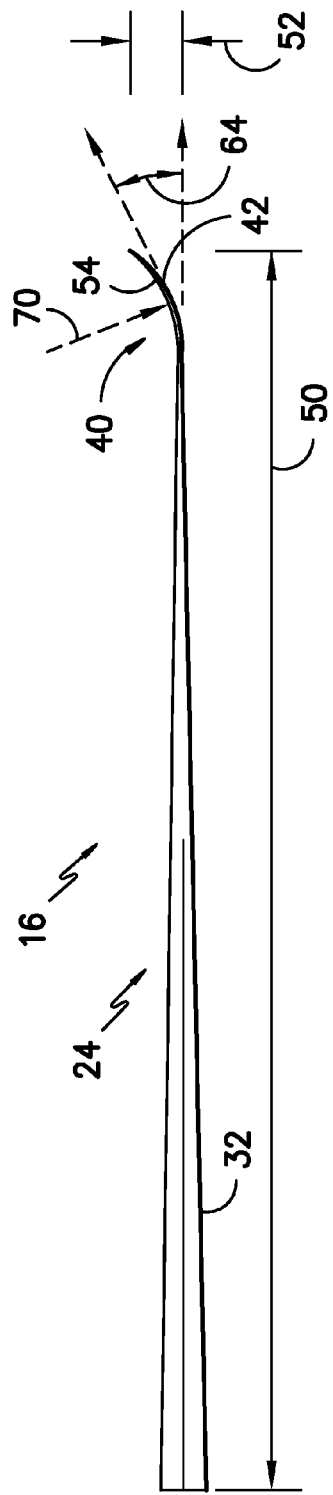
FIG. -5-
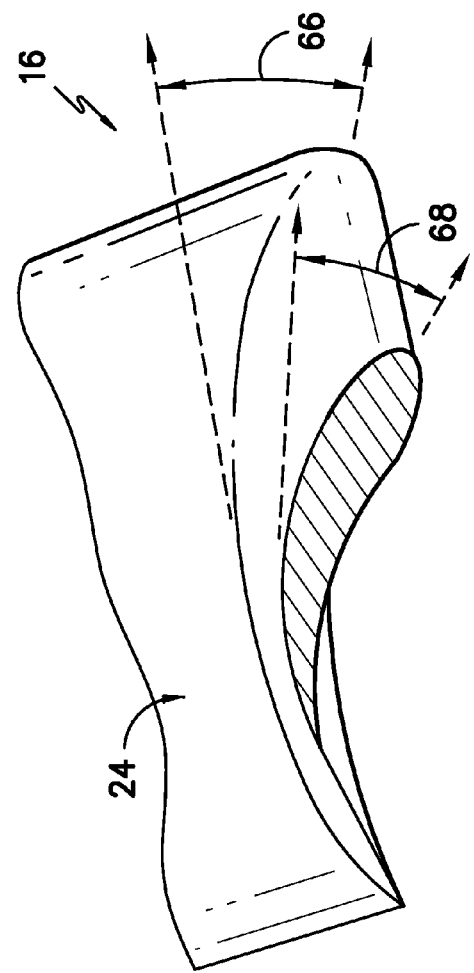
FIG. -6-
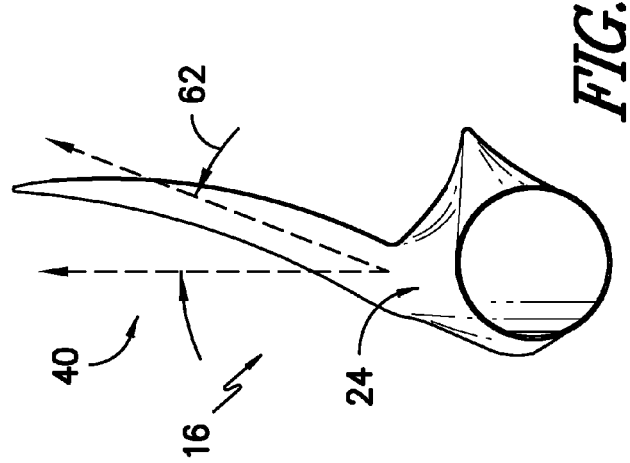
FIG. -4-

WINGLET FOR WIND TURBINE ROTOR BLADE

FIELD OF THE INVENTION

The present subject matter relates generally to rotor blades for wind turbines, and more particularly, to winglets for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy output by modifying the size, configuration and capacity of wind turbines. One such modification has been to include a wingtip device, such as a winglet, at the tip of each wind turbine rotor blade. Generally, winglets can be employed to improve the overall efficiency and performance of a wind turbine. For example, a winglet may decrease the amount of spanwise flow generated at the tip of a rotor blade and, thereby, reduce induced drag on the rotor blade. Winglets may also be installed on rotor blades to reduce the overall diameter of the wind turbine so that loads can be minimized, and to reduce noise emitted by the blades. Further, winglets may also provide an increase in the power coefficient of a wind turbine and, thus, reduce the cost of energy generated by the wind turbine.

However, conventional winglets may have a variety of disadvantages. For example, conventional winglets are generally attached to rotor blades such that the winglets and rotor blades form sharp corners therebetween. These abrupt corners may, for example, increase the drag at the intersections between the winglets and rotor blades, and may thus diminish the benefits, such as increased performance, that were anticipated from the use of the winglets. Further, conventionally known blended winglets, while purportedly reducing the drag at the winglet-rotor blade intersection, may provide only minimal performance benefits.

Thus, an improved winglet for use with a rotor blade in a wind turbine would be desired. For example, a winglet that reduces the drag at the winglet-rotor blade intersection while increasing the performance of the rotor blade would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade for a wind turbine is disclosed. The rotor blade includes a root, a tip, and a body extending from the root, the body including a pressure side and a suction side extending between a leading edge and a trailing edge. The rotor blade further includes a winglet extending between the body and the tip, the winglet including a pressure side and a suction side extending between a leading edge and a trailing edge. The winglet further includes a transition section and defines a height, a sweep angle, an outboard cant angle, and a twist angle. The sweep angle, the outboard cant angle, and the twist angle change continuously throughout the transition section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of one embodiment of a wind turbine of the present disclosure;

FIG. 2 is a perspective view of one embodiment of a rotor blade of the present disclosure;

FIG. 3 is a perspective view of another embodiment of a rotor blade of the present disclosure;

FIG. 4 is rear view of one embodiment of a rotor blade of the present disclosure;

FIG. 5 is a side view of one embodiment of a rotor blade of the present disclosure; and, FIG. 6 is a top cross-sectional view, along the lines 6-6 of FIG. 2, of one embodiment of a rotor blade of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIGS. 2 through 6, a rotor blade 16 according to the present disclosure is shown. The rotor blade 16 may include, for example, a root 20 and a tip 22. The root 20 may be provided and configured for mounting the rotor blade 16 to the rotor hub 18. The tip 22 may generally be that end of the rotor blade 16 opposite to the root 20. The rotor blade 16 may further include a body 24 extending from the root 20. The body 24 may have a pressure side 32 and a suction side 34 extending between a leading edge 36 and a trailing edge 38.

Thus, the body 24 may define a generally aerodynamic profile, to enable the rotor blade 16 to capture kinetic energy from the wind using known aerodynamic principles.

The rotor blade 16 of the present disclosure may further include a winglet 40. The winglet 40 may generally be defined between the body 24 and the tip 22. Thus, the winglet 40 may by the outermost portion of the rotor blade 16 with respect to the root 20. In some embodiments, the winglet 40 may be a separate component of the rotor blade 16 from the body 24, and may be mounted to the body 24. In other embodiments, the winglet 40 and body 24 may be a unitary structure. The winglet 40 according to the present disclosure may provide numerous performance advantages over prior art winglets, including, but not limited to, induced drag reduction, rotor blade size reduction, noise reduction, and increased power coefficient.

In some embodiments, as shown in FIGS. 2 through 6, the winglet 40 may be a suction side winglet, such that the winglet 40 extends outward from the remainder of the body 24 past the suction side 34. In other embodiments, however, the winglet 40 may be a pressure side winglet, such that the winglet 40 extends outward from the remainder of the body 24 past the pressure side 32, or may be both a pressure and suction side winglet.

Similar to the body 24, the winglet 40 according to the present disclosure may have a pressure side 42 and a suction side 44 extending between a leading edge 46 and a trailing edge 48. These various portions of the winglet 40 may be defined as those portions adjacent the respective pressure side 32, suction side 34, leading edge 36, and trailing edge 38 of the body 24. Thus, the winglet 40 may define a generally aerodynamic profile, to enable the rotor blade 16 to capture kinetic energy from the wind using known aerodynamic principles.

The body 24 and winglet 40 may generally define a length 50 of the rotor blade 16, which may be measured in a generally linear direction between the root 20 and the tip 22, as shown in FIG. 5. The winglet 40 may further define a height 52. The height 52 may be measured between the base of the winglet 40 and the tip 22, and may be generally perpendicularly to the length 50. Further, the height 52 may be measured between the tip 22 and a point on the base of the winglet 40 that is furthest from the tip.

As discussed below, the winglet 40 may include a transition section 54. In some exemplary embodiments, the transition section 54 may encompass the entire winglet 40, such that the transition section 54 extends from the body 24 to the tip 22. In other embodiments, as shown in FIG. 3, the winglet 40 may include a body-side section 56 extending between the body 24 and the transition section 54 and/or a tip-side section 58 extending between the transition section 54 and the tip 22.

The winglet 40 according to the present disclosure may have a sweep. For example, in exemplary embodiments, the winglet 40 is an aft-swept winglet. Further, the winglet 40 may have an outboard cant, a toe, a twist, a radius of curvature, and an aspect ratio. Sweep, cant, toe, and twist, radius of curvature, and aspect ratio are commonly known terms in the aerodynamic arts. Thus, the winglet 40 may generally define a sweep angle 62, an outboard cant angle 64, a toe angle 66, a twist angle 68, a radius of curvature 70, and an aspect ratio. The sweep angle 62, as shown in FIG. 4, may generally be defined with respect to a reference line drawn perpendicular to the span of the body 24 and perpendicular to the chord of the body 24 at a cross-section of the body 24 that is at the intersection of the body 24 and the winglet 40. The outboard cant angle 64, as shown in FIG. 5, may generally be defined with respect to a reference line drawn parallel to the span of the body 24 and perpendicular to the chord of the body 24 at a cross-section of the body 24 that is at the intersection of the body 24 and the winglet 40. The toe angle 66, as shown in FIG. 6, may generally be defined with respect to a reference line drawn perpendicular to the span of the body 24 and parallel to the chord of the body 24 at a cross-section of the body 24 that is at the intersection of the body 24 and the winglet 40. The twist angle 68, as shown in FIG. 6, may be defined with reference to the leading edge 46 of the winglet 40, and may generally be defined with regard to the angle of attack of the leading edge 46. The radius of curvature 70, as shown in FIG. 5, defines the radius of the winglet 40 at any point along the winglet 70. The aspect ratio is the ratio of the span of the winglet to the planform area of the winglet.

The transition section 54 according to the present disclosure may be formed such that the sweep angle 62, the outboard cant angle 64, the twist angle 68, and the radius of curvature 70 change continuously throughout the transition section 54. In general, the continuous changes in the various angles and radius may begin at the intersection of the body 24 and the transition section 54 or the body-side section 56 and the transition section 54, and may continue through the transition section 54 to the tip 20 or the tip-side section 58. Beneficially, these continuous changes may result in the winglet 40 having a variety of continuous curves through the height 52, or a portion thereof, with respect to the body 24. The continuous curves may result in reductions in the drag through the transition section 54 and the winglet 40 in general, and may increase the performance of the rotor blade 16 versus rotor blades utilizing prior art winglets.

As mentioned above, in some embodiments, the winglet 40 may include a body-side section 56 and/or a tip-side section 58. The body side section 56 and tip-side section 58 may generally not have a continuously changing sweep angle 62, outboard cant angle 64, or twist angle 68. For example, in some embodiments, the body-side section 56 may have an aerodynamic profile similar to the aerodynamic profile of the body 24, and may thus provide continuity between the body 24 and the winglet 40.

As discussed, the sweep angle 62 may change continuously throughout the transition section 54. In some embodiments, the sweep angle 62 may continuously decrease throughout the transition section 54 towards the tip 22. In exemplary embodiments wherein the winglet 40 is an aft-swept winglet, the leading edge 46 of the winglet 40 may thus be concavely curved throughout the transition section 54, and the trailing edge 48 of the winglet 40 may thus be convexly curved throughout the transition section 54, as shown in FIGS. 2 and 3. Alternatively, the sweep angle 62 may continuously increase, or may increase and decrease throughout various portions of the transition section 54.

In exemplary embodiments, the transition section 54 may have a maximum sweep angle 62. For example, in some embodiments, the maximum sweep angle 62 for the transition section 54 may be in the range between approximately 0 degrees and approximately 80 degrees. In other embodiments, the maximum sweep angle 62 for the transition section 54 may be in the range between approximately 30 degrees and approximately 80 degrees. In other embodiments, the maximum sweep angle 62 for the transition section 54 may be in the range between approximately 30 degrees and approximately 70 degrees. In still other embodiments, the maximum sweep angle 62 for the transition section 54 may be in the range between approximately 45 degrees and approximately 65 degrees. However, it should be understood that the above ranges and angles are non-limiting, and that any suitable maximum sweep angle 62 is within the scope and spirit of the present disclosure.

As discussed, the outboard cant angle 64 may change continuously throughout the transition section 54. In some embodiments, the outboard cant angle 64 may continuously increase throughout the transition section 54 towards the tip 22. In exemplary embodiments wherein the winglet 40 is a suction side winglet, the suction side 44 of the winglet 40 may be concavely curved throughout the transition section 54, and the pressure side 42 of the winglet 40 may be convexly curved throughout the transition section 54, as shown in FIG. 5. Alternatively, the outboard cant angle 64 may continuously decrease, or may increase and decrease throughout various portions of the transition section 54.

In exemplary embodiments, the transition section 54 may have a maximum outboard cant angle 64. For example, in some embodiments, the maximum outboard cant angle 64 for the transition section 54 may be in the range between approximately 5 degrees and approximately 135 degrees. In other embodiments, the maximum outboard cant angle 64 for the transition section 54 may be in the range between approximately 5 degrees and approximately 90 degrees. In other embodiments, the maximum outboard cant angle 64 for the transition section 54 may be in the range between approximately 15 degrees and approximately 80 degrees. In still other embodiments, the maximum outboard cant angle 64 for the transition section 54 may be in the range between approximately 40 degrees and approximately 65 degrees. However, it should be understood that the above ranges and angles are non-limiting, and that any suitable maximum outboard cant angle 64 is within the scope and spirit of the present disclosure.

As discussed, the twist angle 68 may change continuously throughout the transition section 54. In some embodiments, the twist angle 68 may continuously increase throughout the transition section 54 towards the tip 22. Alternatively, the twist angle 68 may continuously decrease, or may increase and decrease throughout various portions of the transition section 54.

In exemplary embodiments, the twist angle 68 may change continuously to a minimum twist angle 68 at the tip 22 of between approximately −0.1 degrees and approximately −10 degrees. In other embodiments, the twist angle 68 may change continuously to a minimum twist angle 68 at the tip 22 of between approximately −0.1 degrees and approximately −5 degrees. In other embodiments, the twist angle 68 may change continuously to a minimum twist angle 68 at the tip 22 of between approximately −0.1 degrees and approximately −1 degrees. In alternative embodiments, the twist angle 68 may change continuously to a maximum twist angle 68 at the tip 22 of between approximately 0.1 degrees and approximately 15 degrees. In other alternative embodiments, the twist angle 68 may change continuously to a maximum twist angle 68 at the tip 22 of between approximately 0.1 degrees and approximately 3 degrees. However, it should be understood that the above ranges and angles are non-limiting, and that any suitable maximum or minimum twist angle 68 is within the scope and spirit of the present disclosure.

Further, the twist angle 68 of the present disclosure may change continuously throughout the transition section 54 in, for example, a linear fashion, a quadratic fashion, or in any suitable fashion or pattern as desired to optimize the performance of the rotor blade 16 and wind turbine 10. It should further be understood that, if desired, the sweep angle 62, outboard cant angle 64, and radius of curvature 70 may additionally change continuously in, for example, a linear fashion, a quadratic fashion, or in any suitable fashion or pattern as desired to optimize the performance of the rotor blade 16 and wind turbine 10

As discussed above, the winglet 40 may, in some embodiments, have a toe angle 66. In some embodiments, the toe angle 66 may be between approximately −5 degrees and approximately 35 degrees. In other embodiments, the toe angle 66 may be between approximately 5 degrees and approximately 20 degrees. In yet other embodiments, the toe angle 66 may be approximately 15 degrees. However, it should be understood that the above ranges and angles are non-limiting, and that any suitable toe angle 66 is within the scope and spirit of the present disclosure.

As discussed above, the winglet 40 has a height 52. In some embodiments, the height 52 may be between approximately 0.03% and approximately 15% of the length 50. In other embodiments, the height 52 may be between approximately 0.05% and approximately 15% of the length 50. In yet other embodiments, the height 52 may be between approximately 0.1% and approximately 15% of the length 50. However, it should be understood that the above percentages are non-limiting, and that any suitable lengths 50 and heights 52 are within the scope and spirit of the present disclosure.

As discussed above, the radius of curvature 70 may change continuously throughout the transition section 54. In some embodiments, the radius of curvature 70 may continuously increase throughout the transition section 54 towards the tip 22. Alternatively, the radius of curvature 70 may continuously decrease, or may increase and decrease throughout various portions of the radius of curvature 70. In exemplary embodiments, the radius of curvature 70 throughout the transition section 54 may be in the range between 10% of the length 50 of the rotor blade 16 and 100% of the length 50 of the rotor blade 16.

As discussed above, the winglet 40 has an aspect ratio. The exemplary embodiments, the aspect ratio 70 may be in the range between 0.5 and 10. Further, in exemplary embodiments, the aspect ratio 70 may remain constant for the winglet 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
   a root;
   a tip;
   a body extending from the root, the body including a pressure side and a suction side extending between a leading edge and a trailing edge; and,
   a winglet extending between the body and the tip, the winglet including a pressure side and a suction side extending between a leading edge and a trailing edge, the winglet further including a transition section and defining a height, a sweep angle, an outboard cant angle, and a twist angle, wherein the sweep angle, the outboard cant angle, and the twist angle change continuously throughout the transition section.

2. The rotor blade of claim 1, wherein the maximum sweep angle for the transition section is in the range between approximately 0 degrees and approximately 80 degrees.

3. The rotor blade of claim 1, wherein the maximum sweep angle for the transition section is in the range between approximately 30 degrees and approximately 80 degrees.

4. The rotor blade of claim 1, wherein the maximum sweep angle for the transition section is in the range between approximately 45 degrees and approximately 65 degrees.

5. The rotor blade of claim 1, wherein the sweep angle continuously decreases throughout the transition section towards the tip.

6. The rotor blade of claim 1, wherein the maximum outboard cant angle for the transition section is in the range between approximately 5 degrees and approximately 135 degrees.

7. The rotor blade of claim 1, wherein the maximum outboard cant angle for the transition section is in the range between approximately 5 degrees and approximately 90 degrees.

8. The rotor blade of claim 1, wherein the maximum outboard cant angle for the transition section is in the range between approximately 40 degrees and approximately 65 degrees.

9. The rotor blade of claim 1, wherein the outboard cant angle continuously increases throughout the transition section towards the tip.

10. The rotor blade of claim 1, wherein the twist angle changes continuously to a minimum twist angle at the tip of between approximately −0.1 degrees and approximately −10 degrees.

11. The rotor blade of claim 1, wherein the twist angle changes continuously to a maximum twist angle at the tip of between approximately 0.1 degrees and approximately 15 degrees.

12. The rotor blade of claim 1, the winglet further including a body-side section disposed between the body and the transition section.

13. The rotor blade of claim 1, the winglet further including a tip-side section disposed between the transition section and the tip.

14. A wind turbine, comprising
a plurality of rotor blades, at least one of the plurality of rotor blades comprising:
a root;
a tip;
a body extending from the root, the body including a pressure side and a suction side extending between a leading edge and a trailing edge; and,
a winglet extending between the body and the tip, the winglet including a pressure side and a suction side extending between a leading edge and a trailing edge, the winglet further including a transition section and defining a height, a sweep angle, an outboard cant angle, and a twist angle,
wherein the sweep angle, the outboard cant angle, and the twist angle change continuously throughout the transition section.

15. The wind turbine of claim 14, wherein the maximum sweep angle for the transition section is in the range between approximately 0 degrees and approximately 80 degrees.

16. The wind turbine of claim 14, wherein the sweep angle continuously decreases throughout the transition section towards the tip.

17. The wind turbine of claim 14, wherein the maximum outboard cant angle for the transition section is in the range between approximately 5 degrees and approximately 135 degrees.

18. The wind turbine of claim 14, wherein the outboard cant angle continuously increases throughout the transition section towards the tip.

19. A rotor blade for a wind turbine, the rotor blade comprising:
a root;
a tip;
a body extending from the root, the body including a pressure side and a suction side extending between a leading edge and a trailing edge; and,
a winglet extending between the body and the tip, the winglet including a pressure side and a suction side extending between a leading edge and a trailing edge, the winglet further including a transition section and defining a height, a sweep angle, an outboard cant angle, and a twist angle,
wherein the sweep angle continuously decreases throughout the transition section towards the tip and the outboard cant angle continuously increases throughout the transition section towards the tip, and wherein the twist angle changes continuously throughout the transition section.

* * * * *